Patented June 17, 1947

2,422,230

UNITED STATES PATENT OFFICE 2,422,230

PRODUCTION OF STREPTOTHRICIN

Jackson W. Foster, Rahway, and Harold Boyd Woodruff, Princeton, N. J., assignors to Merck & Co., Inc., Rahway, N. J., a corporation of New Jersey No Drawing. Application September 11, 1943, Serial No. 502,026

13 Claims. (Cl. 195—96)

This invention relates to processes for the production of streptothricin.

Streptothricin is an antibacterial substance produced by a species of Actinomycetes, called *Actinomyces lavendulae*, a micro-organism described by Waksman and Woodruff (J. Bact. 43, 9–10, 1942; and 40, 581–600, 1940; and Proc. Soc. Expt. Biol. Med. 49, 207–10, 1942) and shown by them to exhibit marked bacteriostatic and bactericidal properties against many different bacteria, including those of the Gram-negative type. Streptothricin is one of the few antibacterial substances of microbial origin which have therapeutic activity against Gram-negative bacteria (Waksman et al., Proc. Soc. Biol. Med. 51, 251–2, 1942).

It was originally proposed to produce streptothricin by incubating the micro-organism *A. lavendulae*, in flasks, the organism growing as a mycelial felt on the surface of a shallow layer of medium. However, such surface layer methods are not entirely satisfactory. Because of the peculiar growth characteristics of Actinomycetes when certain media favorable to streptothricin formation have been employed, great difficulty has been experienced in maintaining a continuous, dry pellicle on the surface of shallow layers, which pellicle is essential for good streptothricin formation. In the shallow layer process, if such a pellicle is not formed across the entire surface of the medium, then streptothricin formation is delayed or reduced; in some instances, streptothricin may not be formed at all. Frequently, in the case of the surface processes, when a surface pellicle does form, it tends to become wet and to drop to the bottom of the vessel, thereby arresting further growth and aerobic metabolic activity and, in such cases, the particular batch involved has to be discarded.

Various expedients have been proposed in an attempt to overcome these disadvantages of the shallow layer method for producing streptothricin. Thus, it has been proposed to utilize a semi-solid medium comprising 0.25% agar. Also, it has been suggested to provide support for the surface pellicle by placing a filling of either cotton or glass wool in the vessel under the shallow layer of medium or to induce the spores to float by distributing powdered talc on the surface. All such expedients are disadvantageous. Thus, if an agar medium is used, the extraction and purification of the active agent from the culture filtrates is complicated and unsatisfactory.

In addition to the above difficulties and disadvantages attendant upon the production of streptothricin by means of shallow layer cultivation of *A. lavendulae*, in certain media, which difficulties and disadvantages are incident to the peculiar characteristics of growth exhibited by Actinomycetes in general, such shallow layer methods present other difficulties in that they are cumbersome and not adapted to large-scale commercial operations.

According to the present invention, it is discovered that *A. lavendulae* is capable of producing streptothricin with commercially important efficiency, and without the disadvantages inherent in the cultivation of this type of micro-organism in shallow layers of medium.

According to our invention, streptothricin is produced in high yields when an aqueous medium is subjected to the action of *A. lavendulae*, under submerged conditions, employing aeration or aeration and agitation. We have found that, under such submerged conditions, a luxuriant growth of the micro-organism is achieved much more rapidly than in stationary surface cultures, and the organism grows homogeneously through the body of the liquid medium in the form of small discrete colonies, and can be cultivated in suitable tanks. Furthermore, the rate of streptothricin formation is markedly accelerated under the submerged conditions of our invention, and maximum streptothricin formation is attained in a shorter period of time than is required under stationary surface growth conditions (2–4 days as compared to 7–14 days).

The nutritional factors affecting streptothricin production by *A. lavendulae*, under submerged conditions, are an assimilable source of energy and carbon, such as dextrose, starch, sucrose, maltose, glycerol, and the like, or mixtures thereof; an organic source of nitrogen, such as a complex organic mixture comprising nitrogenous substances, as, for instance, corn steep liquor, soya bean cake meal, tryptone, or the like, or an amino acid, such as glycine or glutamic acid. The medium also contains the usual mineral nutrients, such as $K_2HPO_4$, $MgSO_4.7H_2O$ and $NaCl$.

Some substances, such as corn steep liquor, or the like, contain all of the nutritional factors essential for the formation and accumulation of streptothricin under submerged conditions, according to our invention, and therefore, an aqueous dilution of the same may be utilized as medium in our process.

The source of carbon and energy can be present in the medium in proportions up to about 10% by weight, 0.5–2% by weight being most desirable. The proportion of the complex organic mixtures comprising nitrogenous substances should be about 0.1 to 10% by weight. If tryptone or glycine, or the like, is used as a nitrogen source, they are preferably used in a proportion of about 0.1 to 5% by weight.

The aeration and agitation employed in our process can be obtained by means of any method, or any device, or combinations of devices which insure adequate solution of air throughout the medium. For example, air may be passed through the depth of medium in a deep tank, having been led into the tank through a simple pipe opening. Adequate solution of the air may be secured by shaking spore-inoculated liquid medium in mechanical shaking machines, or by mechanical agitation, for example, by propellers or a turbo-mixer, or the solution of air may be achieved by passing it through spargers or similar devices which, in effect, comminute the air so that a larger air concentration is presented to the cells suspended in the medium. In the latter case, depending on the type of apparatus employed, passage of the air through the liquid may provide adequate agitation for the successful operation of the process.

The medium is preferably adjusted to a pH in the neighborhood of 5. During the first few hours, the pH may drop somewhat due to the formation of acid from the carbohydrate by the organism, but rises into the alkaline range thereafter. A pH of about 5.0–8.5 is most desirably maintained during the process. If highly acid substances are used in the medium, such as corn steep liquor, for instance, we have found it advisable to add a neutralizing agent, such as calcium carbonate, soluble alkalies, as for instance, NaOH or KOH, or mixtures of calcium carbonate and soluble alkalies, to the medium. Of course, instead of adding the neutralizing agent to the medium, such highly acid substances may be treated therewith prior to addition to the medium.

For best results, the submerged process of our invention is preferably carried out at a temperature of 20–30° C., although temperatures outside that range may also be employed.

In carrying out the submerged process of our invention, a selected medium, in sterile condition, is inoculated with a heavy spore suspension of *A. lavendulae*, and the process is conducted under conditions of aeration, or aeration and agitation, until maximum streptothricin formation is attained, as observed by assay of samples of the culture filtrates.

The following examples illustrate how this invention may be practiced, but it will be understood by those skilled in the art that variations thereof, and substitutions of equivalents are within the broad scope of the invention. In the examples, the antibacterial activity of the culture filtrates is expressed in terms of "streptothricin units"/ml. A streptothricin unit/ml. may be defined as that amount of streptothricin/ml. which prevents the growth of *B. coli*.

*Example I*

To 6 liters of a sterile medium containing

| | Percent by volume |
|---|---|
| Technical dextrose | 2 |
| Corn steep liquor | 3 |
| Distilled water | | contained in a 2 gal. pressure fermenter equipped with propellers is added a heavy spore suspension of *A. lavendulae*, and the mixture is aerated and agitated continuously. Propeller agitation, about 300 R. P. M.; air flow, 10 cf./hr. In 40 hours, a sample of the culture filtrate assayed 31 streptothricin units/ml.

*Example II*

To a sterile medium containing

| | Per cent |
|---|---|
| Dextrose | 1.0 |
| Tryptone | 0.13 |
| $K_2HPO_4$ | 0.2 |
| NaCl | 0.2 |
| Distilled water | | is added a heavy spore suspension of *A. lavendulae*, and the mixture is aerated continuously under submerged conditions. In 5 days, a sample of the culture filtrate contained 10–20 streptothricin units/ml.

*Example III*

To a sterile medium containing

| | Per cent |
|---|---|
| Dextrose | 1.0 |
| Soya bean meal | 0.6 |
| $K_2HPO_4$ | 0.2 |
| NaCl | 0.2 |
| Distilled water | | is added a heavy spore suspension of *A. lavendulae*, and the mixture is aerated continuously under submerged conditions. In 5 days, a sample of the culture filtrate contained 50–100 streptothricin units/ml.

*Example IV*

To a sterile medium containing

| | Per cent |
|---|---|
| Dextrose | 1.0 |
| Corn steep liquor | 3.0 |
| $K_2HPO_4$ | 0.2 |
| NaCl | 0.2 |
| $CaCO_3$ | 0.5 |
| Distilled water | | is added a heavy spore suspension of *A. lavendulae*, and the mixture is aerated continuously under submerged conditions. In 5 days, a sample of the culture filtrate contained 50 streptothricin units/ml.

Modifications may be made in carrying out the present invention without departing from the spirit and scope thereof, and we are to be limited only by the appended claims.

We claim:

1. The process for preparing streptothricin that comprises cultivating the micro-organism *Actinomyces lavendulae* under aerobic submerged conditions in an aqueous medium containing an assimilable source of carbon and energy and a complex organic mixture containing nitrogenous substances.

2. The process for preparing streptothricin that comprises cultivating the micro-organism *Actinomyces lavendulae* under aerobic submerged conditions in an aqueous medium containing an assimilable source of carbon and energy, an organic source of nitrogen, and nutrient mineral salts.

3. The process for preparing streptothricin that comprises cultivating the micro-organism *Actinomyces lavendulae* under aerobic submerged conditions in an aqueous medium containing assimilable carbohydrate, an organic source of nitrogen, and nutrient mineral salts.

4. The process for preparing streptothricin that comprises cultivating the micro-organism *Acti-*

*nomyces lavendulae* under aerobic submerged conditions in an aqueous medium containing an assimilable source of carbon and energy and soya bean meal.

5. The process for preparing streptothricin that comprises cultivating the micro-organism *Actinomyces lavendulae* under aerobic submerged conditions in an aqueous medium containing dextrose and soya bean meal.

6. The process for preparing streptothricin that comprises cultivating the micro-organism *Actinomyces lavendulae* under aerobic submerged conditions in an aqueous medium containing an assimilable source of carbon and energy, soya bean meal, and nutrient mineral salts.

7. The process for preparing streptothricin that comprises cultivating the micro-organism *Actinomyces lavendulae* under aerobic submerged conditions in an aqueous medium containing dextrose, soya bean meal, potassium phosphate and sodium chloride.

8. The process for preparing streptothricin that comprises cultivating the micro-organism *Actinomyces lavendulae* under aerobic submerged conditions in an aqueous medium containing an assimilable source of carbon and energy and corn steep liquor.

9. The process for preparing streptothricin that comprises cultivating the micro-organism *Actinomyces lavendulae* under aerobic submerged conditions in an aqueous medium containing an assimilable source of carbon and energy and neutralized corn steep liquor.

10. The process for preparing streptothricin that comprises cultivating the micro-organism *Actinomyces lavendulae* under aerobic submerged conditions in an aqueous medium containing an assimilable source of carbon and energy, neutralized corn steep liquor, potassium phosphate and sodium chloride.

11. The process for preparing streptothricin that comprises cultivating the micro-organism *Actinomyces lavendulae* under aerobic submerged conditions in an aqueous medium containing dextrose and corn steep liquor.

12. The process for preparing streptothricin that comprises cultivating the micro-organism *Actinomyces lavendulae* under aerobic submerged conditions in an aqueous medium containing dextrose and neutralized corn steep liquor.

13. The process for preparing streptothricin that comprises cultivating the micro-organism *Actinomyces lavendulae* under aerobic submerged conditions in an aqueous medium containing an assimilable source of carbon and energy, tryptone, and nutrient mineral salts.

JACKSON W. FOSTER.
H. BOYD WOODRUFF.

REFERENCES CITED

The following references are of record in the file of this patent:

UNITED STATES PATENTS

| Number | Name | Date |
|---|---|---|
| 1,908,225 | Currie et al. | May 9, 1933 |
| 2,006,036 | May et al. | June 25, 1935 |
| 2,064,359 | Scheffer | Dec. 15, 1936 |
| 2,098,962 | Hellbach | Nov. 16, 1937 |
| 2,121,533 | Wells | June 21, 1938 |
| 2,196,239 | Werkman et al. | Apr. 9, 1940 |
| 2,277,716 | Lockwood et al. | Mar. 31, 1942 |
| 2,314,831 | Kamlet | Mar. 23, 1943 |
| 2,318,641 | Stubbs et al. | May 11, 1943 |
| 1,899,094 | Kluyver et al. | Feb. 28, 1933 |

OTHER REFERENCES

Butlin et al., Chemistry and Industry, Jan. 20, 1940, pp. 41–42.

Waksman et al., "Soil Science," volume 1, No. 2, February 1916, pp. 109, 130.

Waksman et al., Jr. Bacteriology, October 1940, p. 583.

Welsch, Jr., Bacteriology, January 1942, p. 10.